Patented June 14, 1932

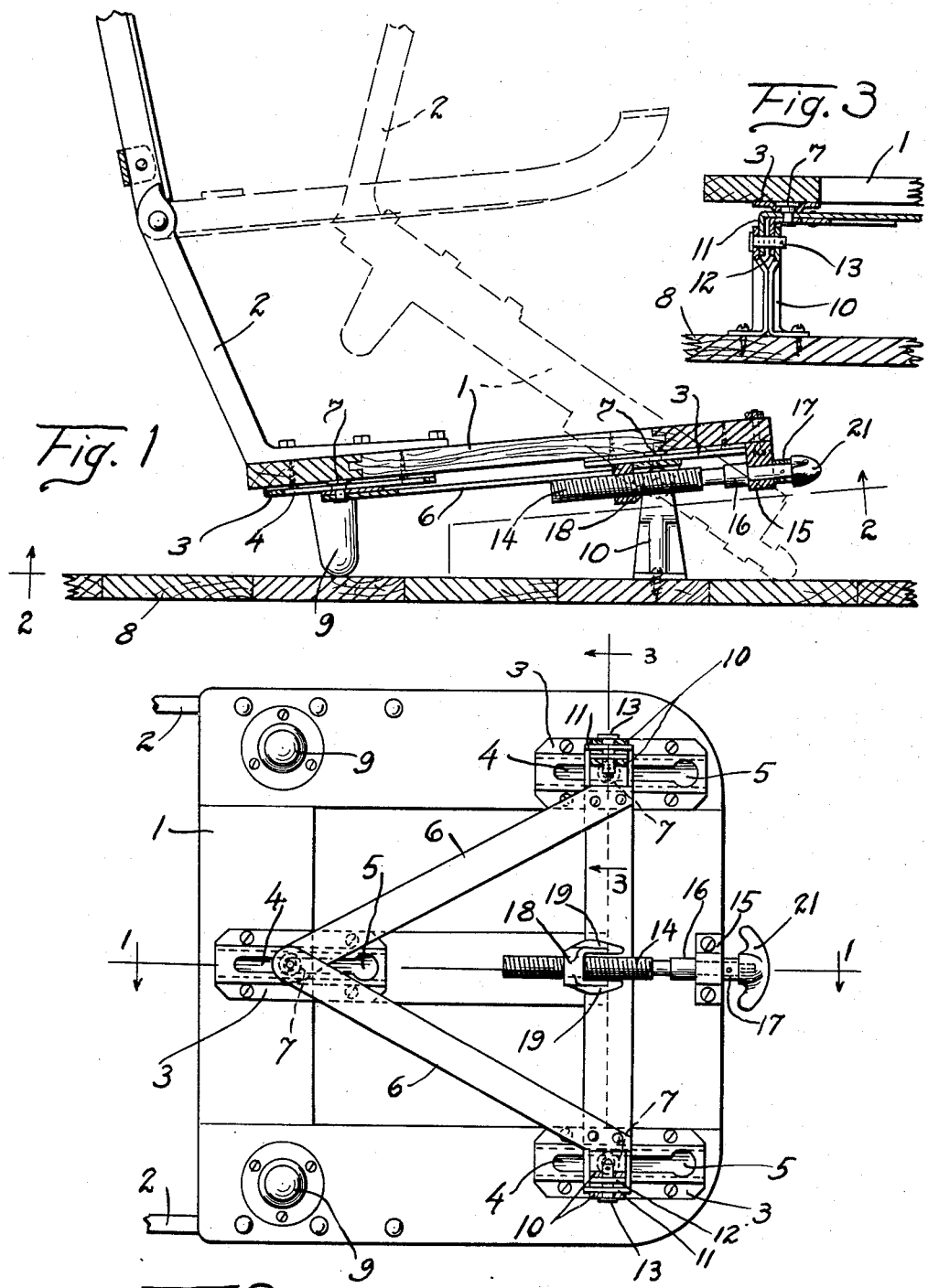

1,863,439

UNITED STATES PATENT OFFICE

HERBERT C. FIELD, OF WINDSOR, ONTARIO, CANADA, AND ANDREW CHRISTIAN ANDERSEN, OF DETROIT, MICHIGAN, ASSIGNORS TO TERNSTEDT MANUFACTURING COMPANY, OF DETROIT, MICHIGAN, A CORPORATION OF MICHIGAN

SEAT REGULATOR

Application filed December 21, 1928. Serial No. 327,525.

This invention relates to a seat regulator especially adapted for folding seats.

It is the object of this invention to present a seat regulator that is simple in construction, easy to operate and that can be assembled and dissembled with a minimum of effort. To this end we provide a seat support, a frame pivoted to that support and adapted to removably and slidably engage a plurality of slotted plates which are fixed to the seat frame.

In the drawing:

Fig. 1 is a vertical section on the line 1—1 of Fig. 2.

Fig. 2 is a bottom plan view of the seat on the line 2—2 of Fig. 1.

Fig. 3 is a section on the line 3—3 of Fig. 2.

Referring more particularly to the drawing, we have shown a slidable seat which consists of a seat bottom which may be referenced 1, to which is attached the seat back 2. Attached to the underside of the seat bottom is a plurality of slotted guides which are designated 3. Each guide has a longitudinal slot 4 which is enlarged at one end as at 5. A triangular frame 6 having depending lugs 11 and 12 at its forward vertices is adapted to slidably engage the slotted guide plates by means of the headed studs 7 which are fixed to the vertices and which are adapted to slide within the slots 4.

The seat is supported from a fixed part of the automobile, which is here shown as the floor 8, by means of the rear legs 9 and the front supports 10. Since the seat bottom and the rear legs are adapted to move forwardly and backwardly, and the front supports are stationary, it is obvious that the angular dispositions of the seat bottom relative to the floor will change in degree. Therefore, that the seat may be adjustable, the seat bottom must be pivotally connected to the floor supports. Hence, to achieve such a true and workable combination, the triangular frame is adapted to pivotally engage the front seat supports 10 by means of the lugs 11 and 12 which pivot about the pins 13 which are secured in the seat supports 10.

The seat is adapted to be adjusted by a seat regulator comprising a screw 14 which is adapted to be turned by any suitable crank 21, and which is journaled in the bearing member 15. The collars 16 and 17 allow the screw to rotate in the bearing member 15 but prevent longitudinal movement of the said screw. The screw operatively engages the travel nut 18 which is fixed to the triangular frame member.

The seat is so constructed that its rearward movement will be stopped before the studs reach the enlarged ends 5 of the longitudinal slots 4 in the guide plates 3, and in this case the bearing member 15 is adapted to abut against the triangular frame the instant the headed studs 7 reach the enlarged ends 5 of the longitudinal slots 4. Hence, there is no danger of the seat being dissembled during its operation.

In order to assemble the seat the guide plates 3 are attached to the seat frame. The studs on the triangular frame are then inserted into the enlarged ends of the slots in the guide members and from thence moved longitudinally so as to engage the narrow portion of the slot. Then the screw is turned into the travel nut and the screw and its bearing 15 subsequently fixed to the seat frame.

From the foregoing description it is obvious that we have presented a seat regulator that is characterized by its simplicity of structure and ease of assembly.

What we claim is:

1. An adjustable seat having in combination a seat bottom, a support therefor, a slotted plate and stud guide members between the seat bottom and the support, and a screw and nut adjusting device for adjusting the seat bottom along the support, the said slotted plates having openings at one end of the slots, and the screw and nut being arranged so that the openings cannot be reached by the studs within the range of adjustment of the screw and nut, but the seat bottom may be disassembled from the support by disengaging the screw.

2. An adjustable seat comprising a seat bottom, a plurality of slotted plates secured to the seat bottom, a support for the seat comprising a frame member having a plurality of headed studs adapted to slidably engage the slotted plates in the said slots and interconnect the support and the seat, manually operable adjusting means secured to the said frame and said seat bottom, the said slotted plates having the slots enlarged at their forward ends, the said adjusting means being arranged so that the enlarged ends of the slots can not be reached by the studs within the range of adjustment of the adjusting means, but the seat bottom may be disassembled from the support by disconnecting the adjusting means from the seat bottom.

In testimony whereof we have affixed our signatures.

HERBERT C. FIELD.
ANDREW CHRISTIAN ANDERSEN.